(12) United States Patent
Chinnel et al.

(10) Patent No.: US 11,105,401 B2
(45) Date of Patent: Aug. 31, 2021

(54) BELT SENSOR SYSTEM

(71) Applicant: GATES CORPORATION, Denver, CO (US)

(72) Inventors: Kane Chinnel, Edgewater, CO (US); Joseph R. Duke, Jr., Elizabethtown, KY (US); Leslee Brown, Broomfield, CO (US)

(73) Assignee: Gates Corporation, Denver, CO (US)

( * ) Notice: Subject to any disclaimer, the term of this patent is extended or adjusted under 35 U.S.C. 154(b) by 521 days.

(21) Appl. No.: 16/045,293

(22) Filed: Jul. 25, 2018

(65) Prior Publication Data
US 2020/0032883 A1 Jan. 30, 2020

(51) Int. Cl.
*G01L 5/105* (2020.01)
*F16H 7/12* (2006.01)
*G01L 5/04* (2006.01)
*F16H 7/08* (2006.01)

(52) U.S. Cl.
CPC .............. *F16H 7/1281* (2013.01); *G01L 5/04* (2013.01); *G01L 5/105* (2013.01); *F16H 2007/081* (2013.01)

(58) Field of Classification Search
CPC ... F16H 7/1281; F16H 2007/081; G01L 5/04; G01L 5/105
See application file for complete search history.

(56) References Cited

U.S. PATENT DOCUMENTS

| | | | |
|---|---|---|---|
| 4,881,552 A | 11/1989 | Heyman | |
| 6,852,050 B2 | 2/2005 | Sands et al. | |
| 7,907,061 B2 | 3/2011 | Lin et al. | |
| 9,228,909 B1* | 1/2016 | Rembisz | G01M 13/023 |
| 9,250,714 B2 | 2/2016 | Hiromi et al. | |
| 2002/0098935 A1* | 7/2002 | Danhauer | F16G 5/20 474/261 |
| 2014/0096608 A1* | 4/2014 | Themm | G01L 1/103 73/579 |
| 2016/0116356 A1* | 4/2016 | Goldstein | G01L 5/105 73/1.15 |

(Continued)

FOREIGN PATENT DOCUMENTS

| | | |
|---|---|---|
| CN | 200996834 Y | 12/2007 |
| GB | 2497100 A | 6/2013 |

(Continued)

OTHER PUBLICATIONS

EETIMES; Design How-To, Infrared proximity sensing: Building blocks, mechanical considerations, & design trade-offs; www.eetimes.com/document.asp?doc_id=1272536.

(Continued)

*Primary Examiner* — Max H Noori

(74) *Attorney, Agent, or Firm* — Alyssa K. Sandrowitz, Esq.

(57) ABSTRACT

A belt sensor system comprising a first IR sensor disposed adjacent to a belt to detect a belt surface proximity and to generate a first signal therefore, a second IR sensor disposed adjacent to a belt to detect a periodic signal from a second belt surface and to generate a second signal therefore, a signal processor operating on the first signal and second signal to calculate a dynamic belt tension, and displaying the dynamic belt tension on a GUI.

15 Claims, 3 Drawing Sheets

(56) References Cited

U.S. PATENT DOCUMENTS

2018/0128352 A1* 5/2018 Scholzen .................. F16H 7/02

FOREIGN PATENT DOCUMENTS

JP 06033829 U 5/1994
JP 5154764 B2 2/2013

OTHER PUBLICATIONS

Enigneering 360 Powered by IEEE GlobalSpec, Proximity Sensors Information, www.globalspec.com/learnmore/sensors_transducers_detectors/proximity_presence_sensing/proximity_presence_sensors_all_types.
European Patent Office, International Search Report and Written Opinion of the International Searching Authority, International application No. PCT/US2019/043013, dated Nov. 13, 2019.

* cited by examiner

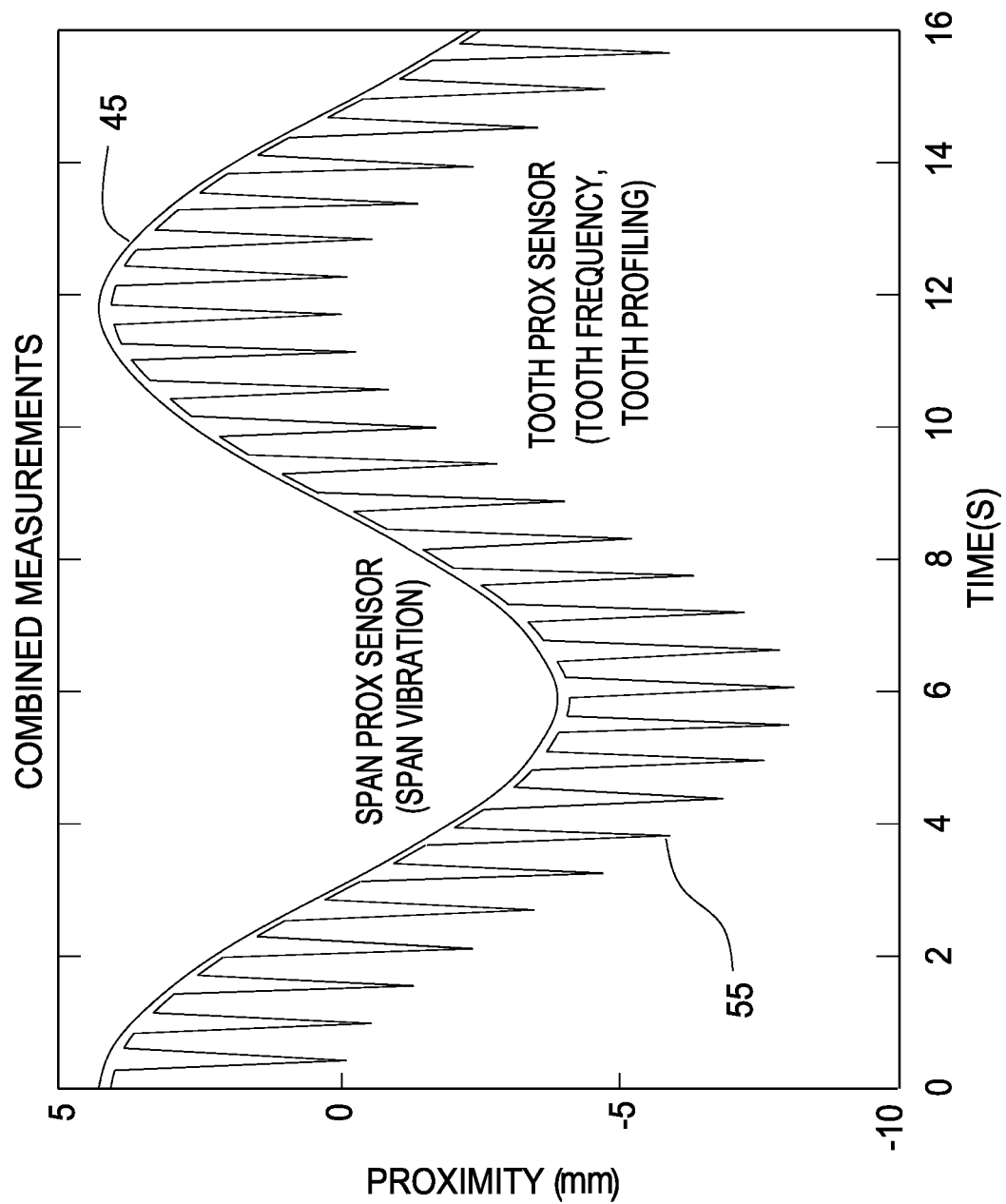

BELT SENSOR SYSTEM

FIELD OF THE INVENTION

The invention relates to a belt sensor system, and more particularly, to a belt sensor system comprising a non-contact belt sensor system having a signal processor operating on a first signal and a second signal to calculate a dynamic belt tension.

BACKGROUND OF THE INVENTION

Power transmission belts rely on proper tension in order to operate properly. Tension can be applied by adjustment of a driver sprocket center with respect to a driven sprocket center. An automatic tensioner can also be used.

In systems where an automatic tensioner is not used the proper operating tension of the belt can gradually decay over time. Loss of tension can cause the belt to slip ultimately resulting in belt failure. Belt failure results in down time for the system.

Belt tension can be determined as a function of oscillation frequency of the installed belt. Acoustic belt tension meters measure the vibrational frequency of a belt in Hz in a stationary condition, that is, the belt system is not operating. Higher frequency indicates a higher tension while a lower frequency indicates a lower tension, not unlike a stringed instrument.

Representative of the art is U.S. Pat. No. 6,852,050 which discloses a lateral sensor positioned proximate to at least one of the edges of a conveyor belt continually monitors the position of the edge of the conveyor belt. If lateral movement is detected by the lateral sensor, an adjustment motor rotates to move an end of a non-drive pulley to adjust for the lateral movement. The lateral sensor can be a non-contacting inductive proximity sensor, a proportional sensor such as a linear variable displacement transducer or a linear potentiometer which determines if the edge of the conveyor belt has moved laterally by monitoring the resistance in the spring, or a Hall effect sensor.

What is needed is a system having a signal processor operating on a first signal and a second signal to calculate a dynamic belt tension. The present invention meets this need.

SUMMARY OF THE INVENTION

An aspect of the invention is to provide a system having a signal processor operating on a first signal and a second signal to calculate a dynamic belt tension.

Other aspects of the invention will be pointed out or made obvious by the following description of the invention and the accompanying drawings.

The invention comprises a belt sensor system comprising a first IR sensor disposed adjacent to a belt to detect a belt surface proximity and to generate a first signal therefore, a second IR sensor disposed adjacent to a belt to detect a periodic signal from a second belt surface and to generate a second signal therefore, a signal processor operating on the first signal and second signal to calculate a dynamic belt tension, and displaying the dynamic belt tension on a GUI.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 4 is a chart of the combined signals.

DETAILED DESCRIPTION OF THE PREFERRED EMBODIMENT

Figure 1:
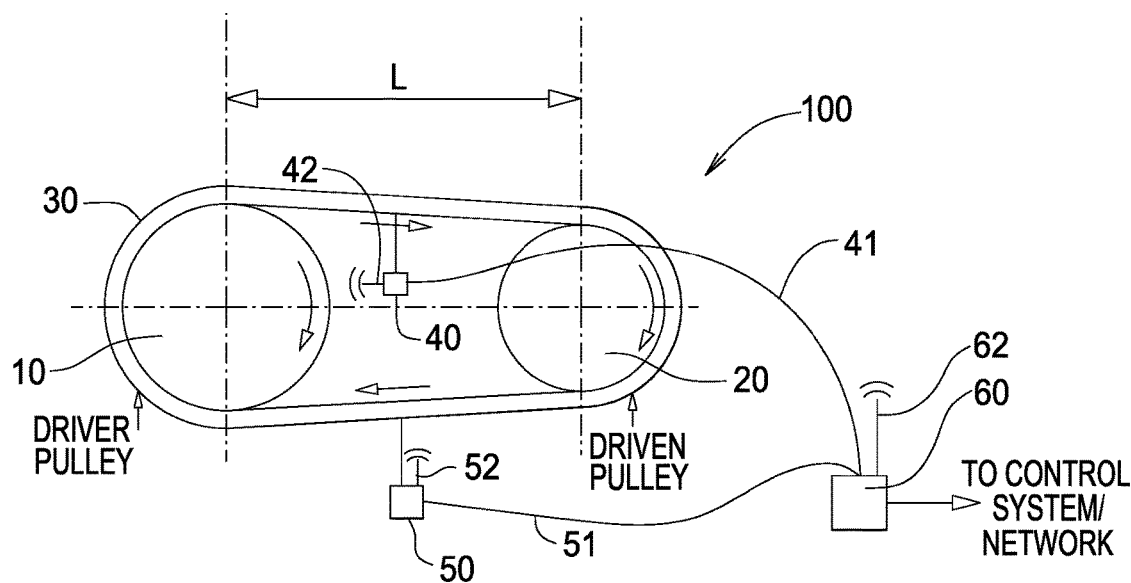
FIG. 1 is a schematic of the system.

FIG. 1 is a schematic of the system. A sensor array comprises two high accuracy, fast sampling, non-contact proximity sensors arranged in parallel.

An example system comprises a driver pulley 10, a driven pulley 20 with a belt 30 trained between them. The sensor array comprises a first infra-red (IR) proximity sensor 40 and a second proximity sensor 50. Both proximity sensors are connected to a digital signal processor (DSP) 60. Processor 60 is connected to a control system network.

Infra-red (IR) sensors are available from numerous sources including InfraTec, Mouser Electronics (#852-GP2Y0D815Z0F, LED style) and STMicroelectronics (#VL53L1X, Class 1 laser style). These examples are only offered to illustrate the breadth of the invention and are not intended to limit the system to only these devices.

Signals from each sensor may be transmitted wirelessly 42, 52 by Bluetooth™ to a receiver 62, or via hardwire 41, 51. Bluetooth™ is a widely adopted wireless technology standard for exchanging data over short distances. The technology uses UHF frequencies the ISM band from 2.4 to 2.485 GHz. It is used on both fixed and mobile devices.

The drive length (L) is between the center of pulley 10 and the center of pulley 20.

Figure 2:
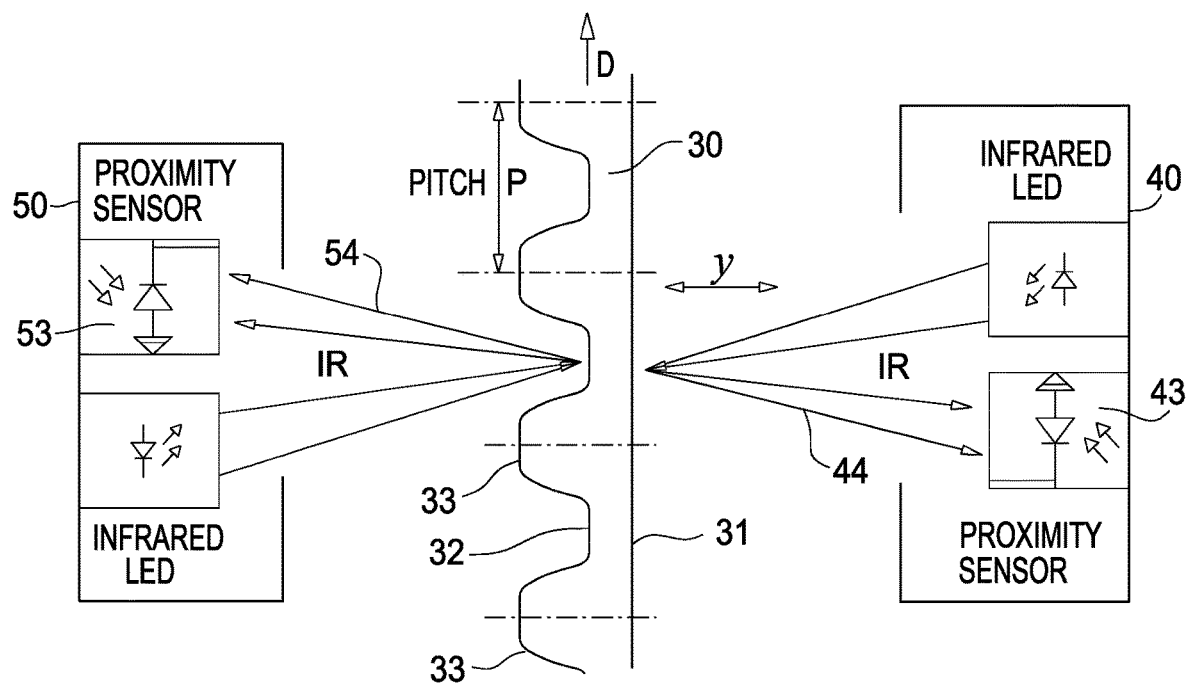
FIG. 2 is a detail of the sensor array.

FIG. 2 is a detail of the sensor array. Proximity sensor 40 generates an analog signal and is used to detect the relative distance of the belt back 31. Sensor 50 generates a digital signal and is used to detect passage of each tooth land area 32 while the belt is in operation. The tooth land area 32 is disposed between adjacent teeth 33. A relative distance to each surface 31, 32 can be determined based on sensor placement and known datum of the belt and of each sensor 40, 50. Preferably, the sensors are placed at or near the belt centerline equidistant between the driver pulley 10 and driven pulley 20.

Sensors 40, 50 measure the vibrations of the first and/or third modes, i.e., the fundamental frequency and/or third harmonics of the vibrating span of belt 30. The equidistant placement of the sensors places them at a node for even harmonics, which therefore do not contribute to the signal. Higher odd harmonics may also be considered negligible. The raw signals are considered a half-rectified cosine/sine wave within a double amplitude waveform, see FIG. 4.

Using the signal from each sensor in conjunction will yield the net, total, or peak-to-peak dimensional displacement of the vibrating belt. After data acquisition, amplitude signal processing techniques are performed by the DSP on the sensor signals. Tooth side proximity sensor 50 detects the meshing/excitation frequency. The DSP filters it from the span vibration signal from sensor 40.

The excitation frequency is a function of the linear tooth velocity of the belt while in operation, hence sensor detects belt velocity. Each flat surface 32 reflects the IR signal to the sensor receiver 53. Since each tooth scatters the IR light, the signal periodically drops out, hence, the signal transmitted by sensor 53 is periodic. The distance between each surface 32 is known and is based on the belt pitch P. The period between each signal 54 from surface 32 can be used to determine the velocity v of belt 30 in direction D.

Similarly, backside proximity sensor 40 measures the excited span vibration ±y and the related frequency of oscillation. Direction ±y is normal to direction D. Surface 31 reflects the IR signal to sensor receiver 43.

A DSP/microcontroller and off-the-shelf IR sensors were used. Two different Sharp IR sensors are selected. A Sharp GP2Y0A51SK0F analog-output distance sensor rated 2-15 cm is used for sensor 40. A Sharp GP2Y0D805Z0F digital-output distance sensor rated for 5 cm is used for sensor 50.

The DSP microcontroller used to dual sample the data was an Arduino Pro™ branded Atmel™ Atmega™328P SMD running on 3.3V at a 8 MHz clock rate, which can be programmed to sample an analog input channel at 4 KHz with 10-bit resolution, and can sample a digital input channel greater than 100 KHz. The microcontroller was also programmed using the Arduino Integrated Development Environment (IDE), a Java based program used to create C-code/firmware for the controller.

The system also includes a MatLab™ based GUI used to parse the messages, log data to file, and display the tooth frequency and vibration of the belt. The com port settings, baud rate, and type of flow control are hard coded into both the microcontroller firmware and GUI software.

Three separate pieces of C code are combined into one main loop on the microcontroller, and a MatLab based user display was written for the purposes of testing the theory and application of this technical investigation; the firmware on the microcontroller for timing control, data acquisition and sending serial messages, and the MatLab script for the graphical user interface (GUI) and datalogging.

The firmware written for the microcontroller is a combination of three separate algorithms; analog sampling of the proximity sensors, and calculating a large array of time series based proximity data through Fast Fourier Transforms (FFT), and a microsecond frequency counter. After setting up non-volatile global variables, timers are declared to accurately control the analog sampling and serial output rates. The serial output rate is statically set to update the COM port at 10 Hz, and the analog sample rate is based on the array size (2^n term) used for FFT. After each sample, the analog value is stored in an circular buffer array for later use. In this system, the array is set to 256 (2^8) terms of which half are real and half are imaginary values; only the real terms are used in the frequency analysis. Since the FFT is a process intensive series of functions, it is only called to operate on the array before the serial output is sent to COM port.

Another algorithm used in the firmware of the DSP/microcontroller is the tooth frequency counter. The logic is identical to RPM sensors in which the time, in microseconds, is measured between the low to high pulse transitions, and placed into a rolling average array. The digital input for the proximity sensor is tied to the pin interrupt function of the microcontroller.

The rolling average of the array is then stored in a global variable where it will be averaged in order to calculate the meshing frequency and drive speed in the serial output to the user display or network.

The serial messages are based on a timer set to call the function every 100 milliseconds, or $\frac{1}{10}^{th}$ of a second, from the microcontroller, and follow a very simple form: 2 bytes used for header, 16 bytes used for the FFT message, 16 bytes used for tooth meshing frequency, and 2 bytes used for endline characters.

The Matlab based GUI script runs user set COM port settings before allowing any messages from the microcontroller through. Once settings are matched, the Matlab pulls each byte from the COM ports' circular buffer, and begins to look for the header bytes sent from the microcontroller. After a correct header comparison, the script will log a timestamp, read the buffer until the endline characters, and write the raw bytes to file. The script also updates plot for FFT, convert the raw the bytes into decimal form, and update values for display.

Sensors 40, 50 detect the relative distances of the belt back and tooth/land areas while the belt is in operation. In the example system the analog (span vibration) sensor 40 has a range of 2-15 cm, and can be placed at approximately 4 cm from the backside 31 of the belt. Similarly, the digital (tooth counter) sensor 50 has a ranged hysteresis of 4.5-5.5 cm, and can be placed approximately 5 cm from the tooth 33 and land side 32 of the belt.

Figure 3:
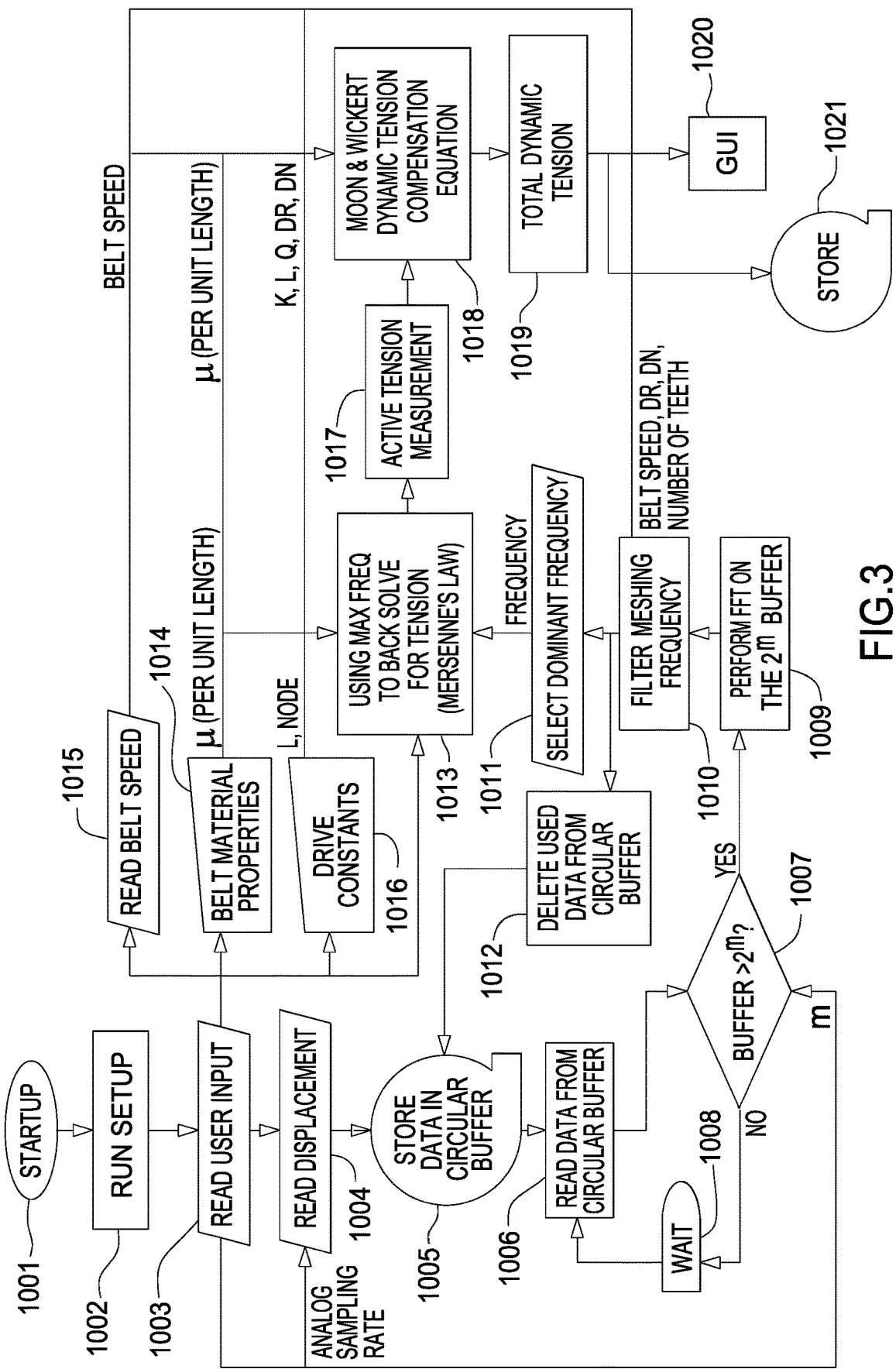
FIG. 3 is a system flowchart.

FIG. 3 is a system flowchart. System start occurs at 1001. Setup is run 1002. User input is read 1003. The displacement signal from sensor 40 is read 1004. Data is stored in the circular buffer 1005. A circular buffer is a data structure that uses a single, fixed-size buffer as if connected head to tail in a circular fashion. This structure is useful for buffering data streams such as from the instant sensor array 40, 50. Data is read from buffer 1006, or directly from user input 1003.

A FFT is performed at 1009. The FFT samples a signal over a period of time and divides it into its frequency components. These components are single sinusoidal oscillations at distinct frequencies each with their own amplitude and phase. Hence, FFT is used to convert a signal from sensor 50 from its original time domain to a representation in the frequency domain and vice versa.

The meshing frequency from sensor 50 is filtered at 1010. The data used at 1009, 1010 is then deleted from the buffer 1012. The dominant frequency is selected 1011. Using the selected dominant frequency (f) at 1013 Mersenne's law is used to calculate the belt tension (T).

Belt speed is calculated from the tooth frequency, and used at 1015. Belt speed can be acquired from a system RPM meter (not shown) or calculated from the meshing frequency. User provided belt material constants are read at 1019. User provided drive constants are read at 1016. Belt material constants 1019 are input to Mersenne's law calculation at 1013.

The difference of the signal from sensor 40 and sensor 50 yields a cleaner span vibration waveform that is used to calculate the frequency of oscillation (f). The derived frequency (f) is used to approximate the active belt tension (T) using Mersenne's Law for string vibrations:

$$T := \mu \cdot \left( \frac{f \cdot 2L}{n} \right)^2$$

Where T=belt tension
    f=frequency
    n=mode or harmonic number
    L=length of span
    µ=linear density (i.e. mass per belt unit length)

The dynamic belt tension (T) is calculated using the system constants, namely, drive center distance (L) and linear density of the belt (µ) in addition to measured values from sensors 40 and 50.

Execution of the calculation at 1013 gives the active tension measurement 1017 (T). The active tension measurement is then input to the dynamic tension $T_{dyn}$ compensation equation 1018. The $T_{dyn}$ term is the sum of W/2 (Static)+half the difference of the tension between T(t) and T(s) which is the applied torque. The W/2 (Static) is equivalent to the static belt tension (W). W is a static load which is applied to the belt through the pulleys at the time of installation.

$T_t-T_s=2Q/D_p$ is the active portion of the equation, where Q is the transmitted torque and $D_p$ is the pitch diameter of the pulleys 10, 20. The span vibration of $T_t$ and $T_s$ are measurable using the proximity sensors, and the tension of each side is calculated using Mersenne's Law solved for tension. T(t) (tight side tension) and T(s) (slack side tension) are calculated in step 1013.

A centrifugal term is due to a running drive=$K*m*v^2$. K is a system constant for units and is set to equal 1 for metric units. Similarly, K=8.6374×10^6 for English units. Lastly, m=μ, and is mass/unit length, and v is the belt speed that is calculated using the measured tooth frequency.

Therefore, the Dynamic tension can be calculated by summing all parts of the equation:

$$T_{dyn}=W/2(\text{static})+/-(T_t-T_s)/2(\text{active})+Kmv^2(\text{centrifugal}).$$

The calculation gives the total dynamic tension $T_{dyn}$ 1019. This result signal can be output to a GUI 1020 or stored 1021 in a system memory.

The total dynamic tension $T_{dyn}$ can be used to control system operation based on dynamic belt tension. For example, alarm limits can be included to alert an operator in the event the system deviates from prescribed limits. System history can be used to estimate remaining belt life.

FIG. 4 is a chart of the combined signals. The raw signal measurements are considered a half-rectified cosine/sine wave within a double amplitude waveform. Signal 45 is from sensor 40. Signal 55 is from sensor 50. The periodic nature of signal 55 is a function of the velocity of passage of each tooth land 32 past sensor 50. The sinusoidal nature of signal 45 is the result of the belt span vibration along an axis normal to the direction of movement D.

Although a form of the invention has been described herein, it will be obvious to those skilled in the art that variations may be made in the construction and relation of parts without departing from the spirit and scope of the invention described herein. Unless otherwise specifically noted, components depicted in the drawings are not drawn to scale. Numeric examples are used to illustrate the invention and are not intended to limit the breadth of the claims. Further, it is not intended that any the appended claims or claim elements invoke 35 U.S.C. § 112(f) unless the words "means for" or "step for" are explicitly used in the particular claim. The present disclosure should in no way be limited to the exemplary embodiments or numerical dimensions illustrated in the drawings and described herein.

We claim:

1. A belt sensor system comprising:
a first infra-red sensor disposed adjacent to a belt detecting a belt surface proximity and generating a first signal therefore;
a second infra-red sensor disposed adjacent to a belt detecting a periodic signal from a second belt surface and generating a second signal therefore;
a signal processor operating on the first signal and second signal to calculate a dynamic belt tension using the equation:

$$T := \mu \cdot \left(\frac{f \cdot 2L}{n}\right)^2$$

Where T=belt tension
f=frequency
n=mode or harmonic number
L=length of span
μ=linear density;
and a GUI for displaying the dynamic belt tension.

2. The belt sensor system as in claim 1, wherein the belt comprises a toothed belt.

3. The belt sensor system as in claim 2, wherein the second infra-red sensor detects a toothed surface of the belt.

4. The belt sensor system as in claim 3, wherein the first infra-red sensor detects variable proximity of a belt surface opposite the toothed surface.

5. A belt sensor system comprising:
a first high accuracy, fast-sampling, non-contact sensor disposed adjacent to a belt detecting a first belt surface proximity and generating an analog signal therefore;
a second high accuracy, fast-sampling, non-contact sensor disposed adjacent to a belt detecting a second belt surface proximity and generating a digital signal therefore;
a signal processor operating on the analog signal and the digital signal to calculate a dynamic belt tension using the equation:

$$T := \mu \cdot \left(\frac{f \cdot 2L}{n}\right)^2$$

Where T=belt tension
f=frequency
n=mode or harmonic number
L=length of span
μ=linear density;
and storing the dynamic belt tension for use by a user; and
a GUI for displaying the dynamic belt tension.

6. A belt sensor system comprising:
a first sensor disposed adjacent to a belt detecting a belt surface proximity and generating an analog signal therefore;
a second sensor disposed adjacent to a belt detecting a periodic signal from a second belt surface and generating a digital signal therefore;
a signal processor operating on the analog signal and the digital signal to calculate a dynamic belt tension using the equation:

$$T := \mu \cdot \left(\frac{f \cdot 2L}{n}\right)^2$$

Where T=belt tension
f=frequency
n=mode or harmonic number
L=length of span
μ=linear density;
and storing the dynamic belt tension for use by a user; and
a GUI for displaying the dynamic belt tension.

7. The belt sensor system as in claim 6, wherein the first sensor is an infra-red sensor.

8. The belt sensor system as in claim 6, wherein the second sensor is an infra-red sensor.

9. A belt sensor system comprising;
a sensor array detecting a toothed belt and generating a first signal from a back side of the belt and a second signal from a tooth side of a belt;

a signal processor operating on the first signal and the second signal to calculate a dynamic belt tension;

a memory for storing the dynamic belt tension; and a GUI for displaying the dynamic belt tension.

10. The belt sensor system as in claim 9, wherein the first is used to determine a belt vibration and the second signal is used to determine a belt velocity.

11. The belt sensor system as in claim 9, wherein the first signal is generated by an IR sensor.

12. The belt sensor system as in claim 9, wherein the second signal is generated by an IR sensor.

13. The belt sensor system as in claim 9, wherein the first signal and the second signal are generated by laser sensors.

14. The belt sensor system as in claim 2, wherein the sensors are focused at opposing surfaces of the toothed belt, at or near the belt centerline equidistant between two drive pulleys.

15. The belt sensor system as in claim 4, wherein the first sensor and the second sensor are laser sensors.

* * * * *